INVENTORS
J. K. ELDERKIN AND
BY F. J. STRASSNER

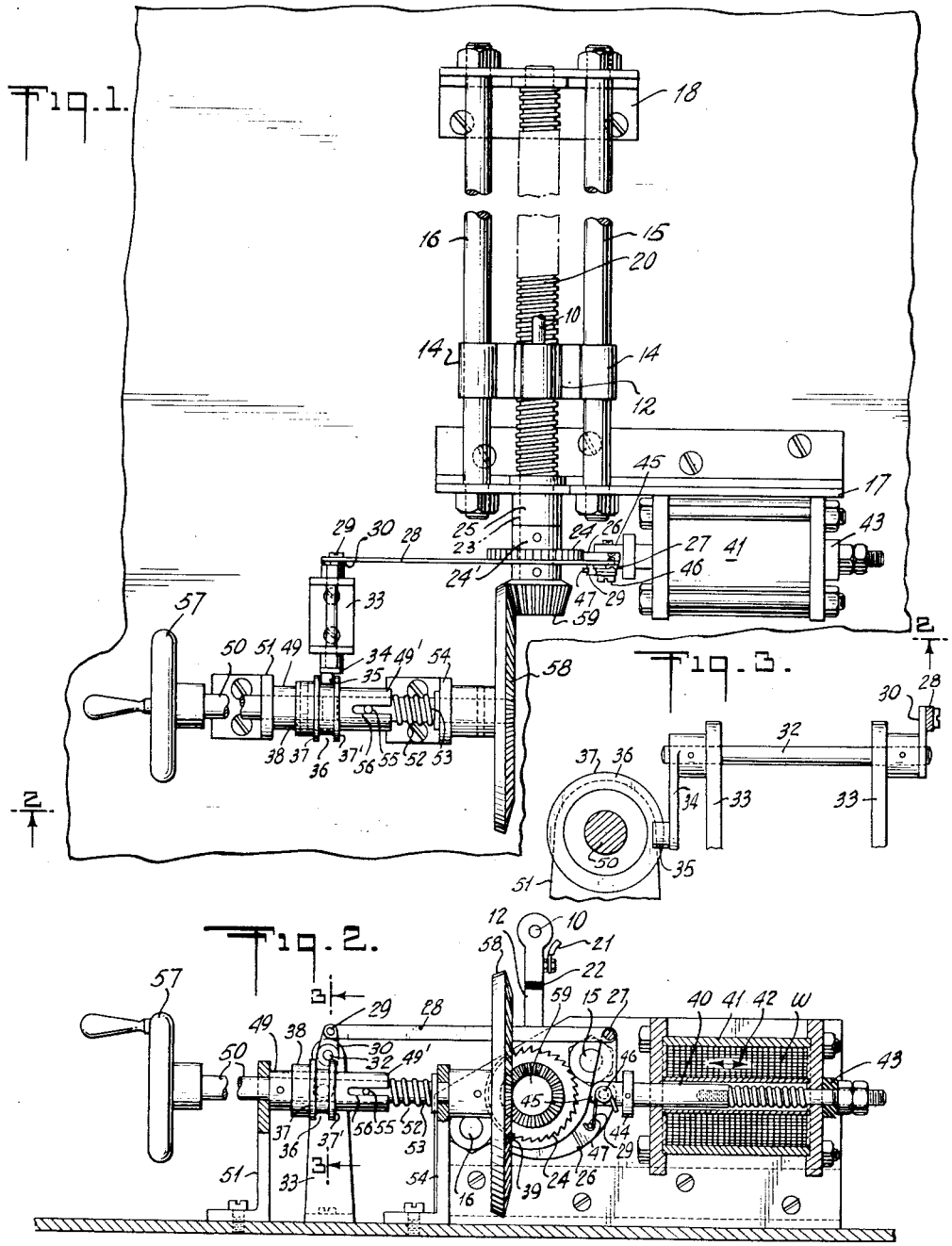

ATTORNEY

Patented Oct. 16, 1951

2,571,552

UNITED STATES PATENT OFFICE 2,571,552

ELECTRODE FEEDING MECHANISM

James K. Elderkin, Montclair, and Frank J. Strassner, Maplewood, N. J., assignors, by mesne assignments, to Joseph J. Mascuch, Maplewood, and James K. Elderkin, Montclair, N. J.

Application August 24, 1946, Serial No. 692,852

2 Claims. (Cl. 314—68)

Heretofore, arc lamp mechanisms have been designed so that the carbon electrodes thereof are fed by a motor driven chain of gears, clutches and cam driven devices to allow adjustment in the rate of carbon feed.

These devices are not entirely satisfactory because changing the feeding speed of either one of the electrodes affects the feeding speed of the other electrode and causes the arc position to get out of focus with the optical system. Lamps of this type require almost constant attention in order to keep them in focus.

Another disadvantage is that a great number of gears is necessary to reduce the high speed of the motor to the low speed of the mechanism.

Another disadvantage is that the clutch mechanisms employed in such devices wear rapidly and easily get out of adjustment, causing the arc to shift from its perfect optical position as the carbons are consumed.

The structure of this invention provides electrode feeding means consisting of relatively few parts, of sturdy structure, operating in a unique manner to assure the feeding of the electrodes in accordance with predetermined requirements, and obviating the various objections noted above with regard to devices heretofore used for the purpose, as will be more particularly pointed out below.

Figure 4:
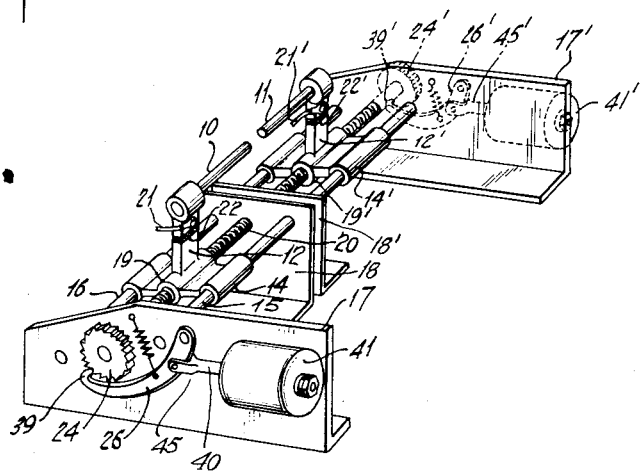
Figure 5:
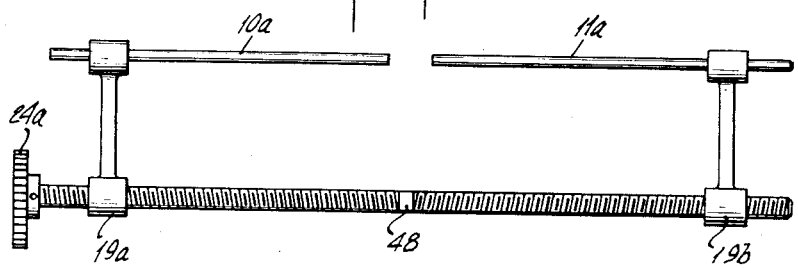
Figure 6:
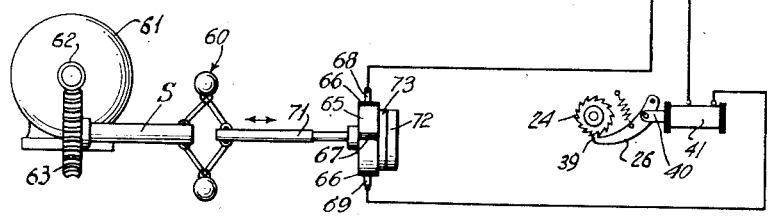
Figure 7:
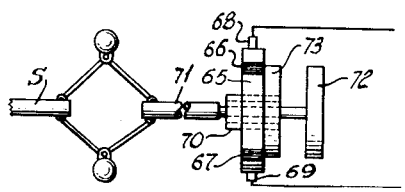

An embodiment of a structure employing the invention is shown in the accompanying drawings and described in detail in the ensuing specification. This embodiment is merely by way of example and the invention is not limited thereto but includes all other forms which would come within the scope of the appended claims. In the drawings, Fig. 1 is a top plan view of an electrode feeding mechanism embodying the invention, Fig. 2 is an elevational view thereof, taken on line 2—2 of Fig. 1, Fig. 3 is a fragmentary, enlarged, vertical elevational view, taken on line 3—3 of Fig. 2, Fig. 4 is a perspective view of an electrode feeding mechanism embodying the invention, Fig. 5 is a side elevational view of another form of the invention, Fig. 6 is a diagrammatic view of a timing means which may be used for the control of the solenoid circuit of the invention, and Fig. 7 is an enlarged fragmentary view thereof, showing the clutch members which are controlled by the governor in their disengaged position responsive to decrease in speed of the governor, said clutch members being part of a timing means which may be used in connection with the invention.

The operation of the mechanism embodying the invention shown in the drawings is as follows: A threaded feed screw 20 carries a suitable carbon holder or carrier 12. Said worm screw 20 has a ratchet wheel 24 keyed thereto and driven by a pawl 26 adapted to turn the ratchet wheel as the pawl is pulled forward. The feed pawl 26 is attached to a solenoid plunger 40 acting against a spring so that, on the plunger being drawn forward, the pawl 26 rotates the ratchet wheel 24 (and thus the feed screw 20) a portion of one revolution.

It is apparent then, that each time the solenoid is energized, the worm 20 is rotated through a predetermined number of degrees, then when the solenoid is de-energized the spring forces the pawl back to its original position on the ratchet wheel and the next impulse of current will again rotate the worm as before. Thus, by feeding the solenoid with timed impulses of current, rotation of the worm feed screw can be timed with the impulses.

Most modern arc lamps require different speeds for the positive and the negative carbon electrodes as the rate of consumption of the electrodes is often not uniform—for example, the rate of consumption of the positive carbon is in many cases as much as three to one with respect to that of the negative.

By the means hereinafter more fully explained, it will readily be seen that, using two exact mechanisms, one for the positive carbon and the other for the negative carbon embodying the invention, the feeding speed of each can be independently timed by merely changing the number of impulses per minute of the respective solenoids. Thus, if the ratio of consumption is three to one, as above suggested, the feeding speeds will be in the ratio of three to one, and one solenoid will, therefore, have an impulse frequency that is three times the impulse frequency of the other; but as each is independently timed, and as the timing of each is such as to provide constancy of rate, and informity of spacing, as between successive impulses, the ratio of feeds will remain uniformly constant, hence will conform at all times to the relative consumption rates of the respective carbons. As a result, the air gap between carbon tips will not undergo any variation whatever, at any period; and this will be true in spite of the fact that one carbon (in the example suggested) is being consumed three times as fast as the other. In other words, the carbon, whose tip is retreating fastest, will have its tip advanced that much faster than the other carbon, hence the distance between carbons will remain constant, and the position thereof in the optical system will not change.

In a lamp where both carbons are consumed at the same rate, only one mechanism is necessary, with one feed screw having both a left and right hand screw and two carbon holders; only one solenoid is required for the mechanism of this adaptation.

Any desired or convenient timing means may be associated with said solenoid to impart impulses thereto at predetermined time intervals. Such timing devices may assume the form of any desired or conventional timing devices, such as those available on the open market. Or they may assume the form shown in Figs. 6 and 7, wherein the timing device comprises essentially a centrifugal force governor. The clutch members 72, 73 engage and disengage at predetermined time intervals as shown in Figs. 6 and 7 to open and close the circuit which energizes the solenoid, thus timing the same.

A structure embodying the invention is shown in Fig. 1 as comprising a carrier 12 having bearings 14 to slidably receive the guide rods 15, 16 which are fixed at opposite ends, in the brackets 17 and 18. Said carrier is further provided with an internally threaded bearing 19 for threaded engagement with the feed screw 20, said feed screw being rotatably journalled in said brackets. A source of current 21, such as an electric cable, is connected with the carrier 12 for the electrode 10, the carrier being preferably provided with insulation means to insulate the same from the bearing portion of the carrier. Such insulation means are generally designated by the numeral 22 and may assume any desired or convenient form. The inner end of feed screw 20 passes through the bracket 17 and has a collar 25 fixed thereto, said collar abutting the bracket 17. Beyond the collar 25 the extended end 23 of the feed screw 20 has a ratchet wheel 24 keyed thereto, as, for example, by means of the hub 24'. On rotation of the ratchet wheel 24, electrode 10 will thus be advanced toward the complementary electrode 11 and bracket 18. The ratchet wheel 24 is rotated by a pawl 26 which is pivoted as at 27 to one end of a link 28, the other end of the link being pivoted as at 29 to a crank arm 30 keyed to the rock shaft 32, the latter being journalled in the U-shaped bearing 33 (see Fig. 3). A second crank arm 34 is fixed to the other end of the rock shaft, said arm 34 having a pin 35 projecting therefrom, said pin being received in a channel 36 defined by the flanges 37, 37' of the collar 38. The collar 38 is provided with a hub 49 keyed to the shaft 50 which is journalled in a bearing plate 51, said hub being maintained normally against the plate 51 under tension by the spring 52 on shaft 53 intermediate a second hub 49' of the collar 38 and the bearing plate 54. Collar 38 is slidably keyed to shaft 53 by pin 55 on said shaft received in slot 56 of hub 49' of the collar. The shaft 53 normally protrudes only partially into the collar 38 (see Fig. 1). The carrier 12 may be returned to its starting position after the carrier has advanced to the end of the feed screw 20 adjacent the bracket 18 on consumption of the electrode 10 as follows: A handwheel 57, keyed to the outer end of the shaft 50 is shifted manually toward the bracket 51 against the tension of the spring 52, said shifting motion being translated through the collar 38, pin 35 and crank arms 34 and 30, to the link 28, which is thus moved toward the handwheel 57, moving pivoted end 27 of pawl 26 with it and thus withdrawing the toothed end 39 of said pawl from the ratchet wheel 24.

The handwheel 57 is then rotated, rotating gear 58 keyed to the inner end of the shaft 53 and which meshes with the pinion 59 keyed to the extended end 23 of the feed screw 20, thereby rotating said feed screw to return the carrier 12 to its original position adjacent the plate 17. By the arrangement described the link 28 is normally held under tension (spring 52 etc.) in the position shown in Fig. 2 to serve as a pivot bearing 27 for the pawl 26 to cooperate in the operation of the pawl and ratchet wheel.

In operation of the device, to advance the electrode 10 toward the electrode 11 at a predetermined rate, the solenoid 41 may be energized by a source of current which is indicated by the conventional plus and minus symbols in Fig. 6. Any suitable means may be cut into said circuit to provide for the regulated periodic impulses of said solenoid. In the form shown in Figs. 6 and 7, and previously referred to, the timing device comprises a governor 60 driven by a motor 61 through the medium of gears 62, 63. One-half of the governor is fixed to the shaft S rotated by said gears, the other half thereof being fixed to stub shaft 71 which has fixed to the end thereof a clutch member 72. The stub shaft 71 passes through the bearing 70 of a contact wheel 65 which has fixed thereto a clutch member 73 adapted to be engaged by the clutch member 72 of stub shaft 71. When the governor is rotated without the load of clutch member 73 and rotating switch member 65 to which member 73 is fixed, responsive to centrifugal force, the governor will draw the stub shaft 71 toward the shaft S thereby moving the clutch member 72 into engagement with the clutch member 73, thereby rotating switch member 65, imposing a load which slows down the governor to disengage the clutch parts—see Fig. 7. Thus the frequency of energization of the solenoid is maintained constant, for each engaging and disengaging movement of the clutch elements will occur at exact time intervals, measured one from another, due, first, to the constancy of the motor speed, and secondly, to the constant periodicity of the centrifugal device 60, which will maintain a regular rhythm of expansive and contractive strokes, each of equal time duration; the magnitude in seconds for each stroke being a function of the initial governor setting, as preadjusted and thereafter maintained. The switch member 65 carries one or more pair of contacts 66, 67 on its periphery, each pair of contacts being peripherally diametrically opposed so that once in each revolution of the member 65, each pair of contacts will have wiping engagement with the fixed contacts 68, 69 of the circuit.

In the operation of the device, the toothed end 39 of the pawl 26 engages the ratchet wheel 24 as shown in Fig. 2. The plunger 40 of the solenoid 41 is reciprocated as indicated by the arrow 42 once responsive to each completion of the circuit through said solenoid. The solenoid is provided with the conventional windings W around plunger 40. At one end, the plunger 40 is provided with a bumper or stop member 43 which may be of resilient material and which may be fixed thereto in any desired or convenient manner as by bolting the same thereto. Adjacent its other end, the plunger has a stub collar 44 fixed thereto. The end 45 of the plunger is bifurcated and is connected to the pawl 26 by pivot pin 46, a spring 47 bearing against or being fixed, at opposite ends to the pin 46 and a pin 29 on pawl 26 to normally urge the latter into engagement with the ratchet wheel 24.

In the form of invention shown in Fig. 4, each of the electrodes 10 and 11 is provided with its independent carrier and associated parts; rotation of the feed screws which engage said carriers to move the same, is timed by the solenoid and associated parts, for such electrode. This form of invention is especially adapted for those applications where, either because of differing rates of consumption of the electrodes or for other reasons, it becomes desirable to advance the same toward each other at different rates of speed or by separate mechanisms.

The solenoid pawl and ratchet mechanisms for electrode 11 in the form shown in Fig. 4 are duplicates of the corresponding parts for electrode 10 and are designated by similar reference characters, primed for the purpose of distinction.

In some applications it may be desirable to move one electrode with respect to a fixed electrode, in which case the mechanism shown in Fig. 1 would suffice, for the electrode to be moved.

In the structure shown in Fig. 5, the electrodes are advanced toward each other at a uniform rate of speed by providing a single feed screw 48 to engage the bearings 19a, 19b of the carriers for the electrodes 10a, 11a. In this form of invention the feed screw is provided with left hand and right hand threads and is keyed to a ratchet 24a which is rotated by a pawl mechanism corresponding to that previously described in connection with Figs. 1, 2 and 4.

While we have shown in the drawings and described in the above specification, a convenient form of structure embodying our invention, it will be apparent from such disclosure that the invention is capable of many modifications without departing from the spirit and scope thereof, as set forth in the appended claims.

Having thus described our invention, what we claim as new and desire to secure by Letters Patent is:

1. In an electrode feeding mechanism having a feed screw and an electrode carrier threadedly engaging said feed screw for movement of the carrier toward a second electrode on rotation of the feed screw in one direction, pawl and ratchet means engaging said feed screw to rotate the latter in said one direction, spring means to normally maintain said pawl and ratchet means engaged, a link connected to said pawl and ratchet means, means normally holding said link under tension in one position to cooperate in the operation of the pawl and ratchet means, and means to move the link to displace the pawl and ratchet means from the feed screw and to rotate the feed screw in a reverse direction.

2. In an electrode feed screw mechanism having spaced brackets, a feed screw journalled in said brackets, an electrode carrier engaging said feed screw, a ratchet wheel and a pinion fixed to said feed screw, pawl means engaging said ratchet wheel to rotate the same and thereby rotate the feed screw in one direction, gear means engaging said pinion to rotate the feed screw in a reverse direction, manual means for rotating said gear means, and means operating to disengage said pawl from the ratchet wheel in response to actuation of said manual means.

JAMES K. ELDERKIN.
FRANK J. STRASSNER.

REFERENCES CITED

The following references are of record in the file of this patent:

UNITED STATES PATENTS

| Number | Name | Date |
|---|---|---|
| 243,196 | Bernstein | June 21, 1881 |
| 968,821 | Viertel | Aug. 30, 1910 |
| 1,239,720 | Preddy | Sept. 11, 1917 |
| 1,565,336 | Seufert | Dec. 15, 1925 |
| 1,650,849 | Preddy | Nov. 29, 1927 |
| 1,669,507 | Dickson | May 15, 1928 |